Jan. 19, 1954   C. S. KENWORTHY ET AL   2,666,422
FUEL GAS VOLUME CONTROL FOR INTERNAL-COMBUSTION ENGINES
Filed Aug. 2, 1952   4 Sheets-Sheet 3

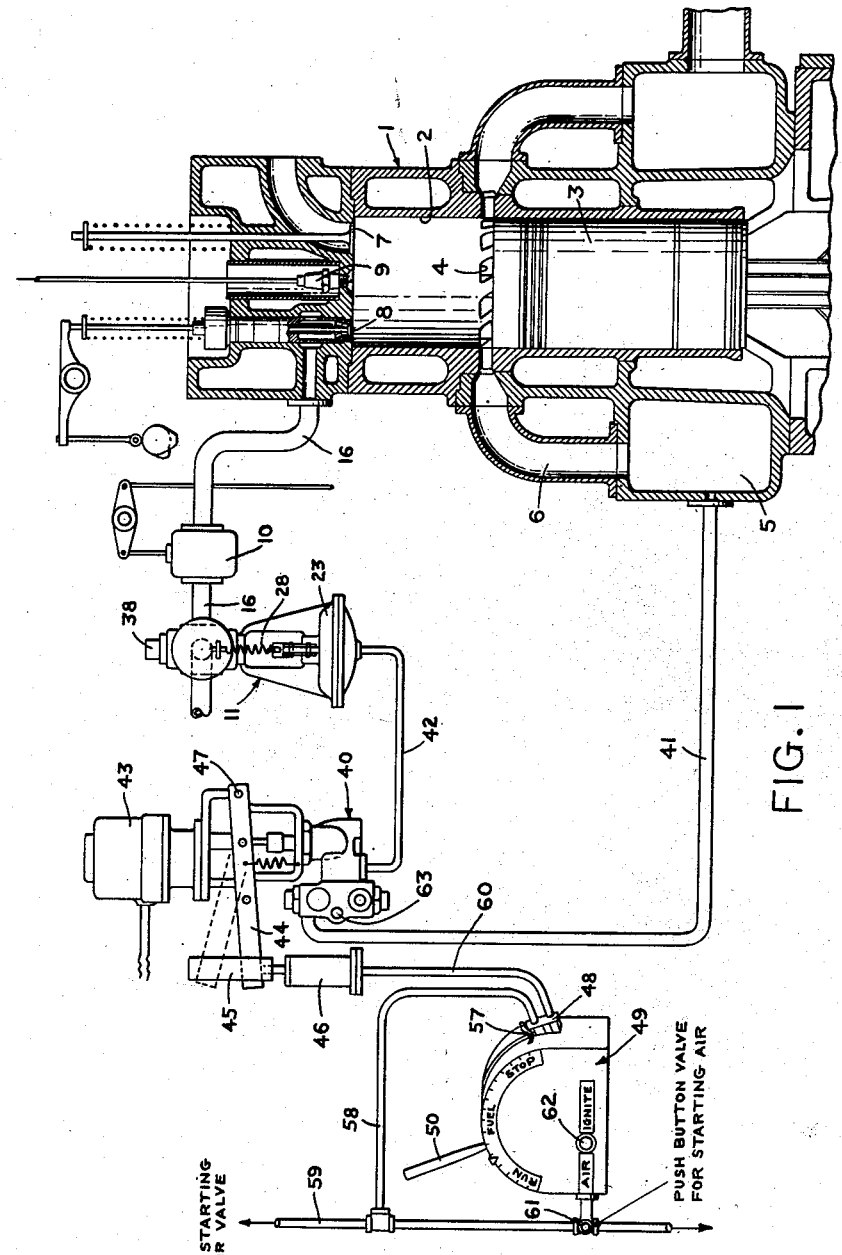

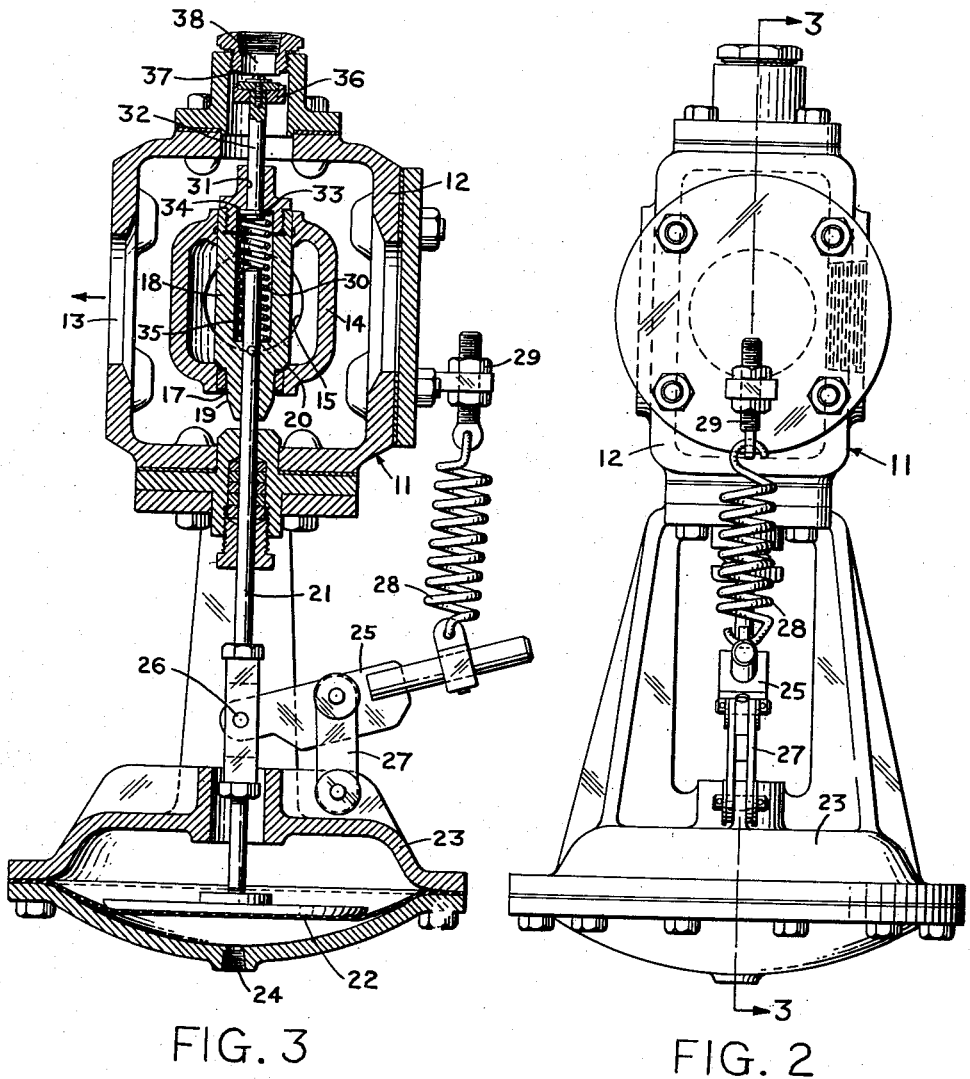

CLARENCE S. KENWORTHY
WILLIAM J. BLESSING
INVENTORS

BY
attorney

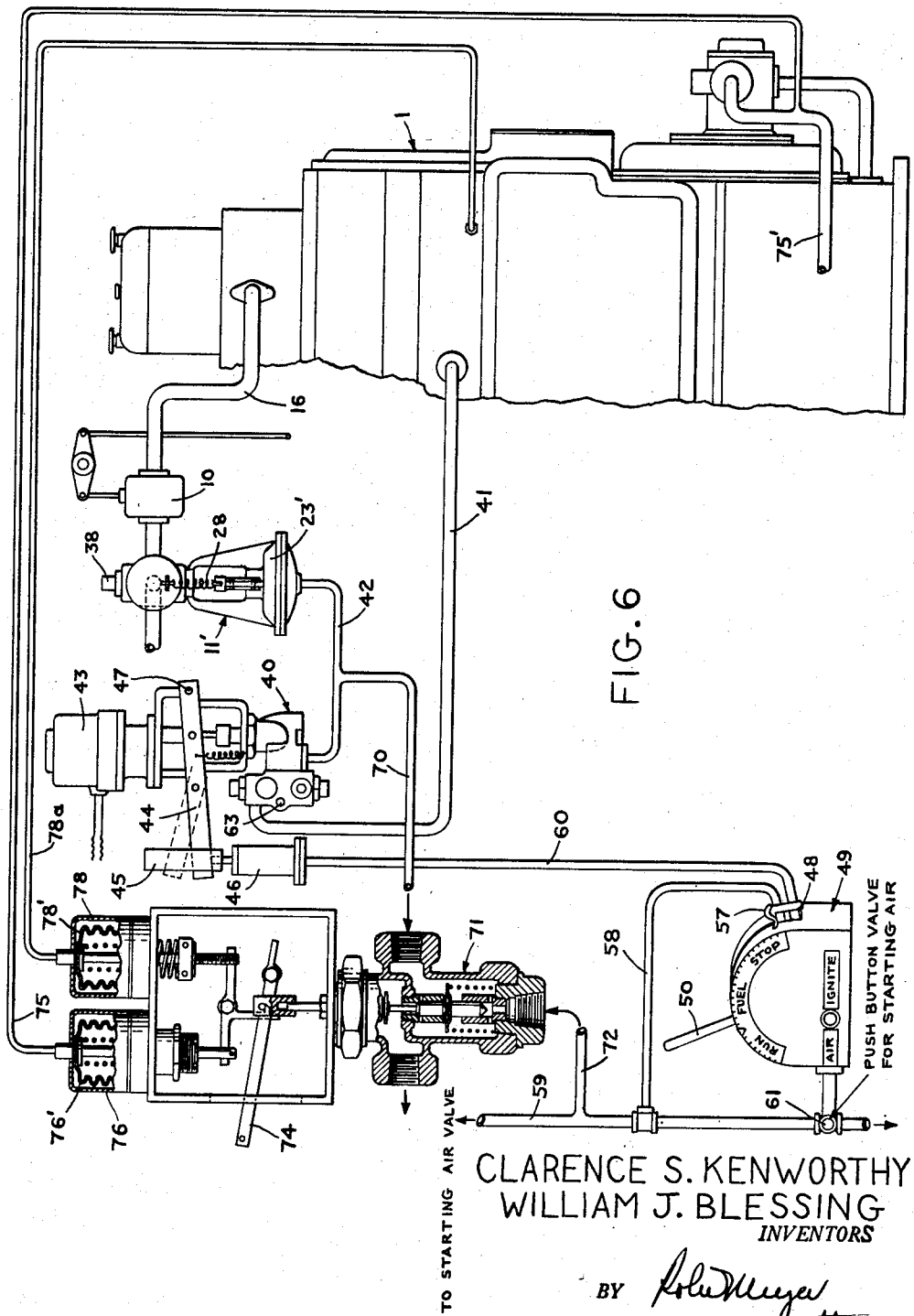

Patented Jan. 19, 1954

2,666,422

UNITED STATES PATENT OFFICE 2,666,422

FUEL GAS VOLUME CONTROL FOR INTERNAL-COMBUSTION ENGINES

Clarence S. Kenworthy, Evanston, Ill., and William J. Blessing, Buffalo, N. Y.; said Blessing assignor to Worthington Corporation, Harrison, N. J., a corporation of Delaware Application August 2, 1952, Serial No. 302,296

21 Claims. (Cl. 123—120)

This invention relates to internal combustion engines and more particularly to spark ignition engines employing gas, such as natural gas, manufactured gas, sewage gas, etc., as fuel.

The primary object of the present invention is to provide means to control the flow of fuel gas to the combustion chamber of an engine in proportionate volume to the scavenging air flow to the engine combustion chamber and to hold the gas-air volume ratio, so controlled, within the combustible range.

The control of the fuel gas flow to the combustion chamber of the engine facilitates starting of the engine in that it eliminates the necessity of gradually increasing the gas supply pressure by slowly advancing the throttle lever until the engine fires and also eliminates false starts of the engine due to excessive gas pressure resulting in an unbalanced gas-air volume ratio.

An object of the present invention is to provide a gas fuel volume control valve connected in the gas fuel supply line of the engine, which volume control valve embodies pressure actuated means for opening the valve. The pressure actuated means is actuated by the pressure of the scavenging air supplied to the engine combustion chamber, pressure of lubricating oil, temperature of cooling water, etc., so that the positive positioning of the gas fuel volume control valve is in proportion to the scavenging air pressure, lubricating oil pressure or temperature of the cooling water.

The volume of air supplied to the engine combustion chamber is relative to the scavenging air pressure, and the fuel gas volume is relative to the port opening in the gas volume control valve, and thus the volume of fuel gas delivered to the combustion chamber is proportionate to the volume of air supplied to the combustion chamber of the engine.

Another object of the present invention is to provide means, in the gas volume control valve, which when the valve is closed and the engine consequently stopped, will bleed off any residual fuel gas which may be trapped in the fuel gas manifold and engine fuel piping between the volume control valve and the combustion chamber, thus preventing premature and dangerous explosions when the engine is re-started.

A further object of the present invention is to provide means which preclude dangerous errors in engine starting operation sequence by providing automatic lock-out of the fuel volume control valve when the manually operated throttle lever of the engine is moved or is away from the stop position and the ignition system is de-energized, which prevents fuel gas from being supplied to the combustion chambers of the engine when improper starting sequence is followed.

With these and other objects in view, as may appear from the accompanying specification, the invention consists of various features of construction and combination of parts, which will be first described in connection with the accompanying drawings, showing a fuel gas volume control for internal combustion engines of a preferred form embodying the invention, and the features forming the invention will be specifically pointed out in the claims.

In the drawings:

Figure 1 is a diagrammatic view partly in section illustrating the fuel gas volume control.

Figure 2 is an enlarged side elevation of the fuel gas volume control valve.

Figure 3 is a vertical section through the fuel gas volume control valve taken on the line 3—3 of Figure 2.

Figure 6 is a diagrammatic view showing the application of the modification shown in Figure 5 to the entire system and showing the apparatus operated by pressure of lubricating oil or jacket water temperature enlarged in proportion to the remaining parts of the system and showing parts of such structure in section.

Figure 4:
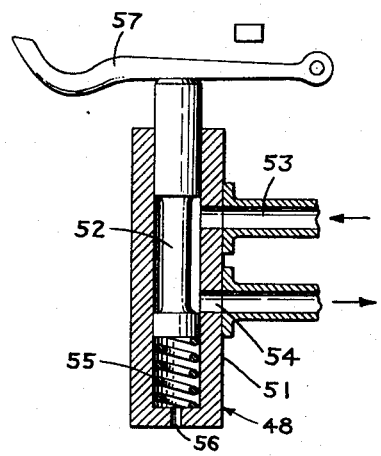
Figure 4 is a detail section through the throttle lever actuated safety lock-out valve.

Referring particularly to the diagrammatic illustration in Figure 1 of the drawings, the spark ignition fuel gas internal combustion engine includes a cylinder 1 having combustion chamber 2 in which the piston 3 reciprocates. The cylinder 1 has a plurality of air inlet openings 4 opening into the combustion chamber through which scavenging air for cleaning or scavenging the cylinder enters the cylinder as well as the air which is used in combination or mixed with fuel gas to provide combustion in the combustion chamber 2. In the form of the engine shown diagrammatically in the drawings the scavenging air is delivered to the scavenging air manifold 5 from any suitable source and from the manifold 5 to suitable piping 6 to the ports 4. It is to be understood, of course, that the present invention is not limited to an engine having a scavenging air manifold as shown at 5, but merely to any engine of this type which includes suitable means for delivering scavenging air to the openings 4. The particular invention is, however, primarily adaptable for use with engines wherein the air to be used and the scavenging air are compressed by a compressor (not shown) operated by the engine.

The fuel is admitted to the combustion chamber 2 through the fuel gas inlet valve 8 as is usual in the construction of engines of this type. The fuel gas and the air mixture is fired in the combustion chamber, when compressed, by a suitable spark plug shown at 9. The pressure of the gas delivered to the engine is in ordinary construction of engines of this type under control of a governor controlled gas metering valve structure 10, construction of which valve forms no part of the present invention.

In the fuel gas volume control system forming the present invention a fuel gas volume control valve structure 11 is connected in the fuel gas supply line at any suitable point, preferably in advance of the governor controlled gas metering valve 10 but the invention is not so limited. The fuel gas volume control valve structure 11 is specifically illustrated in Figures 2 and 3 of the drawings and it comprises the valve housing 12 which has an outlet opening 13 and an inner valve housing 14 the interior of which is connected through a port 15. The fuel inlet port 15 is connected to the supply source of fuel gas (not shown) while the outlet opening 13 is connected to the pipe 16 for supplying fuel gas to the combustion chamber of the engine. The valve housing 14 has an opening 17 therein which establishes communication between the interior of the housing 12 and the interior of the housing 14 so that when the opening or port 17 is opened gas may flow through the volume control valve structure 11. A valve 18 is carried by the housing 14 for reciprocatory movement relative thereto and it has a tapered end 19 which cooperates with the opening 17 to vary or graduate the cross sectional area of the open part of the opening 17 so that the quantity or volume of gas permitted to flow through the volume control valve 11 is regulated by the position of the reciprocating valve 18 and when the reciprocating valve 18 is seated upon the valve seat 20 a flow of fuel gas through the volume control valve is cut off. A valve stem 21 is connected to the reciprocating valve 18 for moving this valve and it has its end remote from the valve 18 connected to a diaphragm 22 enclosed in a fluid tight housing 23. The fluid tight housing has an inlet 24 to permit the inlet of a pressure fluid into the housing 23 for acting against the diaphragm 22 to positively move the valve 18 in open position in accordance with the degree of the pressure applied to the diaphragm 22 and thus the volume of fuel gas permitted to flow through the volume control structure 11 is regulated by the pressure exerted against the diaphragm 22 and consequently will be in proportion to such pressure.

A pivoted lever 25 is connected to the valve stem 21 as shown at 26 and it is pivotally supported by a suitable link 27 attached to the housing 23. A spring 28 is connected to the lever 25 and the spring 28 is tensioned and the lever 25 is positioned so that when the tension of the spring 28 exceeds the pressure applied to the diaphragm 22 the spring will seat the valve 18 on the valve seat 20 and cut off the flow of fuel gas through the valve. The usual construction of threaded rod and nut arrangement shown at 29 is provided for adjusting the tension of the spring 28.

The reciprocating valve 18 is provided with an axial bore 30 which opens out through the top of the valve through a reduced bore 31. A bleed-off control valve stem 32 is mounted for reciprocating movement in the bores 30 and 31. The stem 32 has an enlarged head 33 engaging the shoulder 34 formed by the reduced bore 31. A spring 35 is coiled in the bore 30 and engages the head 33 on the end of the stem 32 for urging the valve or closure element 36 which was mounted on the outer or upper end of the stem 32, into engagement with the seat 37. The seat 37 surrounds a bleed-off opening 38 which opens into the interior of the housing 12 so that when the valve 18 is closed and the engine consequently is shut down the valve 36 will be moved off of its seat and any residual gas contained in the housing 12 and the piping 16 will be bled to atmosphere thus relieving the engine piping or manifold of trapped fuel gas which might cause dangerous explosions upon the re-starting of the engine.

In the system shown in Figure 1 of the drawings scavenging air from the scavenging air supply manifold or piping 5 or 6 of the engine is delivered to the interior of the housing 23 for action against the diaphragm 22 through a three-way valve structure 40 by means of suitable piping 41 in advance of the valve structure 40 and piping 42 between the valve structure 40 and the pressure actuated diaphragm 22. The valve structure 40 is a solenoid-held three-way valve of any approved construction which may be purchased upon the open market, the operation of the valve being dependent upon operation of its solenoid 43 and also upon the safety reset feature provided through the medium of the lever 44 which is connected to and operates the valve structure. The lever 44 is connected through the medium of a connector 45 with its piston of an ordinary pressure actuated piston and cylinder construction 46 so that when pressure fluid is delivered to the cylinder and piston structure 46 the lever 44 will be operated on its pivot 47 to operate the valve 40 to open the valve to permit scavenging air to flow through the valve into the housing 23 for action on the diaphragm 22.

Starting air pressure is employed in the present system for operating the cylinder and piston construction 46 and such starting air is delivered to the cylinder and piston construction 46 through a three-way valve 48. The valve 48 is carried by the housing of the throttle structure 49 which includes the manually operated throttle lever 50.

The valve structure 48 includes a housing 51 in which a plunger valve 52 reciprocates for making or breaking communication between the pressure air inlet port 53 to the cylinder 51 and the pressure outlet port 54 of the cylinder. The plunger valve 52 is urged into position to cut off communication between the ports 53 and 54 by means of a spring 55 and when communication between the ports 53 and 54 is cut off air is bled from the cylinder 46 back through the port 54 and out through the bleed-off port 56 in the cylinder 51. The end of the plunger valve 52 remote from the end engaged by the spring 55 projects out of the cylinder 51 and is engaged by a pivoted lever 57 which is positioned in the fashion of the throttle lever 50 so that when the throttle lever 50 is moved to stop position the lever 57 will be operated to open the ports 53 and 54 to communication with each other. The inlet port 53 of the valve structure 48 is connected through suitable pipe 58 with the line 59 which delivers starting air to the engine cylinders and the outlet port 54 is connected to the cylinder 46 through suitable piping 60.

Flow of starting air to the engine is controlled by the usual type of manually operated push button switch 61 which is an ordinary construction usually employed in engines of this type for controlling the flow of the starting air to an engine. The electrical circuit through the spark plug 9 and also through the solenoid 43 of the solenoid actuated valve structure 40 is controlled by a manually operated push button switch structure 62 of the usual ordinary construction employed for this purpose. The push button switch structure 62 is indicated as carried by the housing 49 of the throttle structure.

Upon starting an engine, the push button switch 61 is operated to admit starting air to the cylinders of the engine and at such time the throttle lever 50 is in the stop position having actuated the lever 57 to operate the valve plunger 52 to establish communication between the ports 53 and 54. Thus when starting air is admitted to the cylinders of the engine a part of the starting air will flow through the valve structure 48 to the cylinder and piston structure 46 and move the piston thereof and the lever 44 into the upper dotted line position shown in Figure 1. This operation will open the valve 40. The operation of the engine by the starting air will build up some pressure of scavenging air which is delivered to the combustion chamber 2 under control of the piston 3 as it reciprocates and some of this scavenging air will flow through the valve 40 into the housing inlet 24 and act upon the diaphragm 22 moving the diaphragm and consequently the valve 18 to open the port 17 in increments corresponding to the degree of pressure of the scavenging air thus permitting fuel gas in proportion to the pressure of the scavenging air to be delivered to the combustion chambers of the engine through the governor actuated metering valve structure 10 permitting a proper combustible mixture of air and fuel gas to be delivered to the combustion chamber so as to provide proper ignition thereof when the push button switch 62 is operated to turn on the ignition system. As the engine starts and is continued in operation by the explosion of the gas in the combustion chamber the pressure of the scavenging air increases and the valve 18 is, in consequence thereof, opened greater distances still in proportion to the pressure of the scavenging air. When the throttle lever 50 is moved from the stop position into a running position the spring 55 of the valve structure 48 acts to cut off the flow of starting air to the piston and cylinder structure 46 and such pressure as is in the cylinder 46 bleeds therefrom back through the valve structure 48 to atmosphere permitting the piston to assume its normal position. At this time, the solenoid 43 being energized by the operation of the ignition control switch 62 takes over and the valve 40 is held open thereby so that so long as the engine is running scavenging air will be delivered to the housing 23 for holding the valve 18 open in a degree corresponding to the pressure of the scavenging air.

When the engine is stopped or stops for any reason the pressure of the scavenging air on the diaphragm 22 will be relieved by bleeding of the scavenging air from the housing 23 through the bleed-off port 63 in the valve 40 and the spring 26 will move valve 18 into closed position moving the valve 36 off of its seat and opening the interior of the housing 12 and the fuel supply line 16 to atmosphere through the bleed-off or vent opening 38 thus allowing the bleeding of or the venting of any residual gas in the housing 12 and the fuel line 16 to atmosphere.

Figure 5:
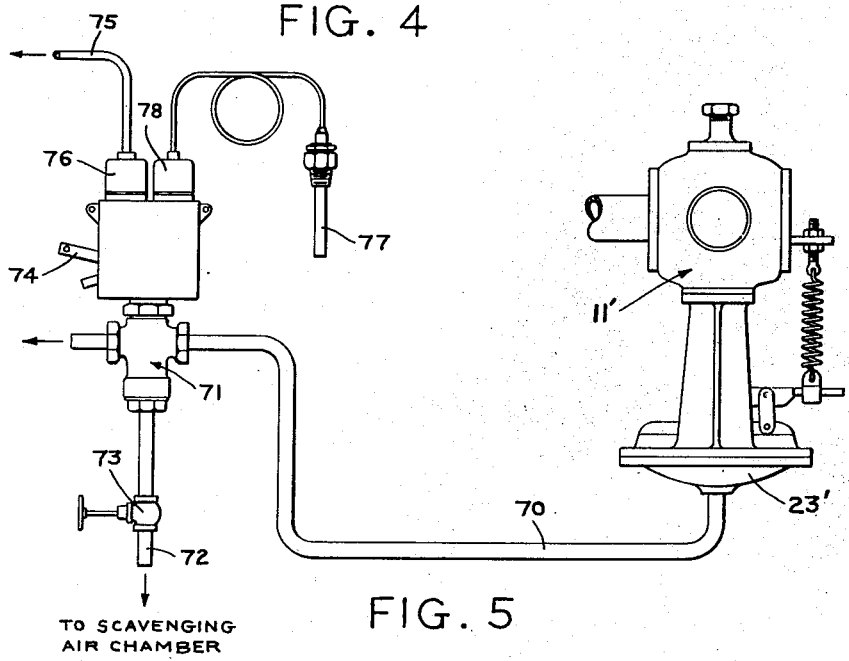
Figure 5 is a diagrammatic view of a modified form of the fuel gas volume control mechanism embodying means for control of volume of fuel gas by pressure means responsive to pressure of the scavenging air and closing gas valve when low lubricating oil pressure or high jacket water temperature occurs.

Figure 5 of the drawings shows additional control means associated with the fuel volume control valve so that the engine may be shut down by cutting off the supply of fuel gas thereto by other means than the operation of the throttle lever or failure of the scavenging air.

Gas shut-off is considered to be the most practical means of stopping a spark ignition gas engine, than is ignition interruption since engine stoppage caused by gas shut-off leaves the engine in a purged state, with the use of the vent or bleed-off feature of the fuel gas volume control valve, whereas engine stoppage caused by ignition interruption leaves the engine completely flooded with fuel gas. The flooded condition is extremely hazardous since any glowing residual carbon in the cylinders or exhaust manifold may ignite the gas causing an explosion and also might cause undesirable explosions upon the restarting of the engine.

The fuel volume control valve structure 11' shown in Figure 5 of the drawings is identical with the fuel gas control valve structure just described and its operation is controlled by pressure of scavenging air which is delivered to the housing 23' through suitable piping 70 which is connected through a three-way valve structure 71 to the scavenging air chamber of the engine through the medium of the piping 72. A manually operated needle valve 73 may be inserted in the piping 72. The three-way valve structure 71 shown in Figure 5 of the drawings is a Fulton Sylphon #530 P. T. V. special temperature pressure operated three-way valve which may be purchased upon the open market, and this valve may be operated through the medium of the lever 74 by a cylinder and piston structure identical with that described in connection with Figure 1 of the drawings and in the same manner. However, this valve structure 71 is susceptible by operation of various other pressure means and it has a connection 75 to the lubricating oil supply line 75' of the engine at any suitable point, whereby the bellows 76' of the pressure mechanism 76 for operating the valve 71 is subjected to the pressure of the lubricating oil in the engine so that in the event of failure of pressure of the lubricating oil the mechanism 76 will be operated to operate the valve 71 and cut off the flow of scavenging air to the housing 23' thus cutting off the flow of fuel gas to the engine and stopping its operation. A second type of control of the valve 71 is provided and this includes a thermal bulb 77 which is placed at any suitable or convenient position in the cooling water system jacket of the engine and is connected to the bellows 78' in the usual manner as shown at 78a so that the mechanism 78 will be subject to operation of the thermal bulb 77 and thus when the temperature of the jacket water reaches an excessive or undesirable degree the valve 71 will be operated to cut off the flow of the scavenging air to the fuel gas volume control valve 11' thus permitting closing of the valve and the stoppage of the engine.

It will be understood that the invention is not to be limited to the specific construction or arrangement of parts shown, but that they may be widely modified within the invention defined by the claims.

What is claimed is:

1. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means actuated by pressure of scavenging air for positively operating said fuel gas volume control valve, and means for bleeding off any residual fuel gas from the fuel gas supply line between the volume control valve and the engine when said volume control valve is closed.

2. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means actuated by pressure of scavenging air for positively operating said fuel gas volume control valve, said fuel gas volume control valve having a bleed-off opening therein open to atmosphere and to the fuel gas supply line between the volume control valve and said combustion chamber, means actuated upon operation of said volume control valve to close said bleed-off opening when the volume control valve is open and to open the bleed-off opening when the volume control valve is closed.

3. In a fuel gas volume control for internal combustion engines, the combination with an internal combustion engine including a combustion chamber, scavenging air supply means, a governor controlled fuel gas supply valve, and a line for supplying fuel gas to said governor controlled valve, of a fuel gas volume control valve in the gas fuel supply line, and means for operating said fuel volume control valve.

4. In a fuel gas volume control for internal combustion engines, the combination with an internal combustion engine including a combustion chamber, scavenging air supply means, a governor controlled fuel gas supply valve, and a line for supplying fuel gas to said governor controlled valve, of a fuel gas volume control valve in the gas fuel supply line, means for operating said fuel volume control valve, said fuel gas volume control valve having a bleed-off opening therein open to atmosphere and the fuel gas supply line between the volume control valve and said combustion chamber, means actuated upon opening of the volume control valve to close said bleed-off opening, and means operable upon closing of the volume control valve to open said bleed-off opening.

5. In a fuel gas volume control valve for internal combustion engines, the combination with an internal combustion engine including a combustion chamber, scavenging air supply means, a governor controlled fuel gas supply valve, and a line for supplying fuel gas through said governor controlled valve to said combustion chamber, of a fuel gas volume control valve connected in the gas fuel supply line, means operated by pressure of scavenging air for opening said fuel gas volume control valve to permit control passage of fuel gas to the combustion chamber, and a spring for closing said volume control valve upon relief of pressure of scavenging air to said pressure operated means.

6. In a fuel gas volume control for internal combustion engines, the combination with an internal combustion engine including a combustion chamber, scavenging air supply means, a governor controlled fuel gas supply valve, and a line for supplying fuel gas to said governor control valve, of a fuel gas volume control valve in the gas fuel supply line, and means for operating said fuel volume control valve, said fuel gas volume control valve having a bleed-off opening therein open to atmosphere and the fuel gas supply line between the volume control valve and said combustion chamber, means actuated upon opening of the volume control valve to close said bleed-off opening, and means operable upon closing of the volume control valve to open said bleed-off opening, said fuel gas volume control valve having a bleed-off opening therein open to atmosphere and to the fuel gas supply line between the volume control valve and said combustion chamber, a valve member connected to the volume control valve structure and operable therewith upon opening of the volume control valve to close said bleed-off opening and to open the bleed-off opening upon closure of the volume control valve.

7. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means operated by pressure of scavenging air for opening said volume control valve to permit control passage of fuel gas to the combustion chamber, said engine including a manually operated throttle handle, and means operated by said throttle handle to control flow of scavenging air to said pressure operated means.

8. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means operated by pressure of scavenging air for opening said volume control valve to permit control passage of fuel gas to the combustion chamber, said engine including a manually operated throttle handle, means operated by said throttle handle to control flow of scavenging air to said pressure operated means, and a spring for closing said volume control valve upon relief of pressure to said pressure operated means.

9. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, said gas fuel control valve comprising the valve seat, a tapered valve for cooperation with said valve seat, means for opening said volume control valve in increments to control the volume of fuel gas delivered through the volume control valve, said means for opening said volume control valve comprising a diaphragm, a fluid tight housing enclosing said diaphragm, means for delivering scavenging air from the scavenging air supply means to said housing for action on said diaphragm, and means independently of said diaphragm for closing said tapered valve, said fuel gas volume control valve having a bleed-off opening therein open to atmosphere and the fuel gas supply line between the volume control valve and said combustion chamber, means actuated upon opening movement of said tapered valve for closing said bleed-off opening and for opening the bleed-off opening upon closing of said tapered valve.

10. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, said gas fuel control valve comprising a valve seat, a tapered valve for cooperation with said valve seat, and means for opening said volume control valve in increments to control the volume of fuel gas delivered through the volume control valve, said means for opening said volume control valve comprising a diaphragm, a fluid tight housing enclosing said diaphragm, means for delivering scavenging air from the scavenging air supply means to said housing for action on said diaphragm, and means independently of said diaphragm for closing said tapered valve, said fuel gas volume control valve having a bleed-off opening therein open to atmosphere and the fuel gas supply line between the volume control valve and said combustion chamber, means actuated upon opening movement of said tapered valve for closing said bleed-off opening and for opening the bleed-off opening upon closing of said tapered valve, said engine including a manually operable throttle handle, and means operated by said throttle handle to control flow of scavenging air to said pressure operated means.

11. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means actuated by pressure of scavenging air for positively operating said fuel gas volume control valve, and means acted upon by pressure of lubricating oil in the engine for closing said volume control valve when the pressure of lubricating oil falls below a predetermined pressure.

12. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means actuated by pressure of scavenging air for positively operating said fuel gas volume control valve, and means acted upon by temperature of cooling water in the engine for closing said volume control valve when the temperature of the cooling water rises above a predetermined degree.

13. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, and means actuated by pressure of scavenging air for positively operating said fuel gas volume control valve, and means for bleeding off any residual fuel gas from the fuel gas supply line between the volume control valve and the combustion chamber when said volume control valve is closed.

14. In a fuel gas volume control for internal combustion engines, the combination with an internal combustion engine including a combustion chamber, scavenging air supply means, a governor controlled fuel gas supply valve, a line for supplying fuel gas to said governor controlled valve, of a fuel gas volume control valve in the gas fuel supply line, means for operating said fuel volume control valve, and means for bleeding off any residual fuel gas from the fuel gas supply line between the volume control valve and the combustion chamber when said volume control valve is closed.

15. In a fuel gas volume control for internal combustion engines, the combination with an internal combustion engine including a combustion chamber, scavenging air supply means, a governor controlled fuel gas supply valve, and a line for supplying fuel gas through said governor controlled valve to said combustion chamber, of a fuel gas volume control valve connected in the gas fuel supply line, means operated by pressure of scavenging air for opening said fuel gas volume control valve to permit control passage of fuel gas to the combustion chamber, a spring for closing said volume control valve upon relief of pressure of scavenging air to said pressure operated means, and means for bleeding off any residual fuel gas from the fuel gas supply line between the volume control valve and the combustion chamber when said volume control valve is closed.

16. In a fuel gas volume control for internal combustion engines, the combination with an internal combustion engine including a combustion chamber, scavenging air supply means, a governor controlled fuel gas supply valve, a line for supplying fuel gas to said governor controlled valve, of a fuel gas volume control valve in the gas fuel supply line, and means actuated by pressure of scavenging air for positively operating said fuel gas volume control valve.

17. In a fuel gas volume control for internal combustion engines, the combination with an internal combustion engine including a combustion chamber, a scavenging air supply means, a governor controlled fuel gas supply valve, a line for supplying fuel gas to said governor controlled valve, of a fuel gas volume control valve in the gas fuel supply line, and means actuated by pressure of scavenging air for positively operating said fuel gas volume control valve, and means acted upon by pressure of lubricating oil in the engine for closing said volume control valve when the pressure of lubricating oil falls below a predetermined pressure.

18. In a fuel gas volume control for internal combustion engines, the combination with an internal combustion engine including a combustion chamber, scavenging air supply means, a governor controlled fuel gas supply valve, a line for supplying fuel gas to said governor controlled valve, of a fuel gas volume control valve in the gas fuel supply line, means actuated by pressure of scavenging air for positively operating said fuel gas volume control valve, and means for bleeding off any residual fuel gas from the fuel gas supply line between the volume control valve and the engine when said volume control valve is closed.

19. In a fuel gas volume control for internal combustion engines, the combination with an internal combustion engine including a combustion chamber, scavenging air supply means, a governor controlled fuel gas supply valve, a line for supplying fuel gas to said governor controlled valve, of a fuel gas volume control valve in the gas fuel supply line, means actuated by pressure of scavenging air for positively operating said fuel gas volume control valve, means for bleeding off any residual fuel gas from the fuel gas supply line between the volume control valve and the engine when said volume control valve is closed, and means acted upon by temperature of cooling water in the engine for closing said volume control valve when the temperature of the cooling water rises above a predetermined degree.

20. In a fuel gas volume control for internal combustion engines, the combination with an internal combustion engine including a combustion chamber, scavenging air supply means, a governor controlled fuel gas supply valve, a line for supplying fuel gas to said governor controlled valve, of a fuel gas volume control valve in the gas fuel supply line, means actuated by pressure of scavenging air for positively operating said fuel gas volume control valve, means for bleeding off any residual fuel gas from the fuel gas supply line between the volume control valve and the engine when said volume control valve is closed, means acted upon by temperature of cooling water in the engine for closing said volume control valve when the temperature of the cooling water rises above a predetermined degree, and means acted upon by pressure of lubricating oil in the engine for closing said volume control valve when the pressure of lubricating oil falls below a predetermined pressure.

21. In a fuel gas volume control for internal combustion engines, the combination with an internal combustion engine including a combustion chamber, scavenging air supply means, and a line for supplying fuel gas to said combustion chamber, of a fuel gas volume control valve connected in the gas fuel supply line, means actuated by pressure of scavenging air for positively operating said fuel gas volume control valve, said fuel gas volume control valve having a bleed-off opening therein open to atmosphere and to the fuel gas supply line between the volume control valve and said combustion chamber, means actuated upon operation of said volume control valve to close said bleed-off opening when the volume control valve is open and to open the bleed-off opening when the volume control valve is closed, and means acted upon by pressure of lubricating oil in the engine for closing said volume control valve when the pressure of lubricating oil falls below a predetermined pressure.

CLARENCE S. KENWORTHY.
WILLIAM J. BLESSING.

References Cited in the file of this patent
UNITED STATES PATENTS

| Number | Name | Date |
|---|---|---|
| 1,910,279 | Buchi | May 23, 1933 |
| 2,375,071 | Boyer | May 1, 1945 |